No. 735,201.

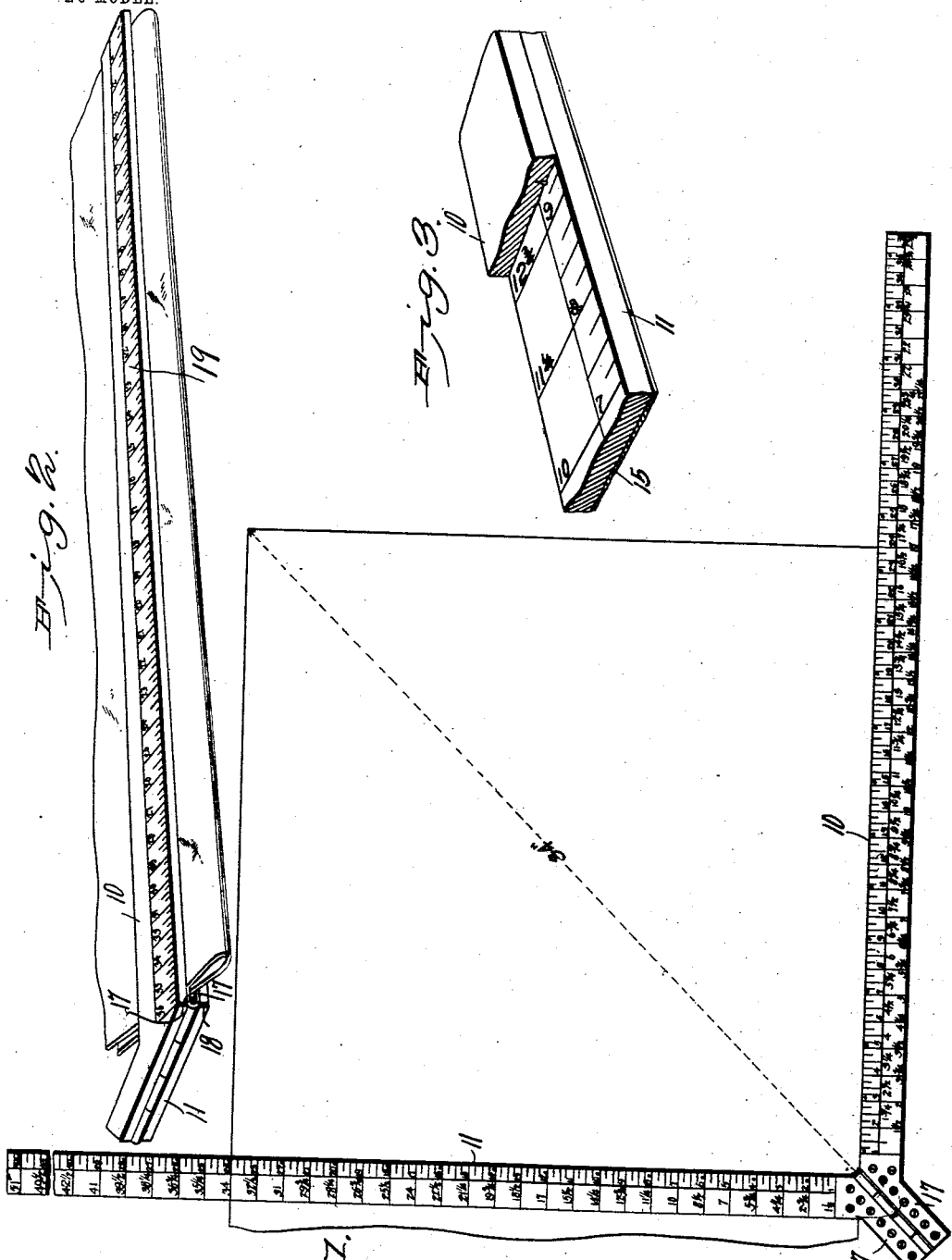

Patented August 4, 1903.

UNITED STATES PATENT OFFICE.

WALKER H. BLANDIN, OF SEDALIA, MISSOURI.

INSTRUMENT FOR CUTTING CLOTH ON THE BIAS.

SPECIFICATION forming part of Letters Patent No. 735,201, dated August 4, 1903.

Application filed May 23, 1902. Serial No. 108,720. (No model.)

*To all whom it may concern:*

Be it known that I, WALKER H. BLANDIN, a citizen of the United States, residing at Sedalia, in the county of Pettis and State of Missouri, have invented a new and useful Instrument for Cutting Cloth on the Bias, of which the following is a specification.

The object of the present invention is to provide an improved device for measuring and facilitating the cutting of cloth on the bias or on a line extending diagonally to the selvage edges.

One of the principal objects of the invention is to form an improved measuring and computing scale for determining the width of a piece of cloth cut in this manner or for determining the length of the same along the selvage or the length of the piece of cloth between the two selvage edges.

A further object is to so construct the device as to form a clamp for holding the cloth in folded position to facilitate the cutting operation, and a still further object is to provide an improved form of miter-hinge for connecting the two sections of the device with a view of strengthening the connection and firmly holding the two sections in proper position, as well as to form a handle to assist in manipulating the same.

With these and other objects in view the invention consists in the novel construction and arrangement of parts hereinafter described, illustrated in the accompanying drawings, and particularly pointed out in the appended claims.

In the drawings, Figure 1 is a plan view of the device for measuring and cutting goods on the bias, the device being shown in open position as employed for measuring a piece of fabric to be cut. Fig. 2 is a perspective view of the device in closed position, showing the same employed as a clamp to hold the goods during cutting. Fig. 3 is a sectional perspective view of a portion of the device, showing the arrangement of the cloth-holding pins.

Similar numerals of reference are employed to indicate corresponding parts throughout the several figures of the drawings.

The device consists, essentially, of a base member 10, which is placed along the selvage of the cloth to be cut, and a cross-arm 11, which is placed across the width of the cloth in a line at right angles to its length. The upper face of the base-arm, as shown in Fig. 1, is provided with a pair of measuring-scales, the inner scale being preferably a yard in length and divided into thirty-six main divisions, each representing one inch, and these may be further subdivided to any desired extent. The outer or lower scale is intended to represent the width of a piece of cloth having a known length of selvage, or vice versa, the scale being so arranged that the salesman may ascertain at a glance the proper cutting-point when either of these measurements is known. Thus, for instance, a piece of fabric having a selvage length of eighteen inches would be approximately twelve and three-quarters inches in width and a piece of fabric six inches in width would have a selvage length approximately of eight and one-half inches. The scales are of course based on the ordinary rules of geometry governing the relative lengths of the sides of a right-angle triangle and the hypotenuse, and while it is not possible from a practical standpoint to have these measurements absolutely correct they are all approximately so. For instance, the length of the hypotenuse of a right-angle triangle having two sides each six inches in length is eight and four hundred and eighty-four thousandths of an inch, while in the present scale this measurement is made eight and one-half inches, an increase of sixteen-thousandths part of an inch, which is near enough for all practical purposes. The lower scale thus represents the base or perpendicular of an isosceles right-angle triangle the length of the hypotenuse of which is denoted by the corresponding scale-mark in the adjoining inch-scale. The inner edge of the cross-arm is provided with a yard-scale divided into inches and fractions thereof, and on the outer edge of the cross-arm the corresponding lines are marked to designate the diagonal length between selvages of a piece of cloth of which the width is known, or, in other words, the width of the cloth in inches being known and the measurement representing the base or perpendicular of a right-angle isosceles triangle the hypotenuse is denoted by the alining scale-mark on the outer scale. Thus, for instance, a piece of cloth sixteen inches in width would have a length along a diagonal line of twenty-two and one-half inches and a piece of cloth having a width of twenty-five inches would have a diagonal length of thirty-five and one-quarter inches.

In using the device the goods will be measured along the lower selvage edge by the upper scale of the base-arm, and if the section required has a selvage length of eighteen inches the eighteen-inch mark on the base-arm is placed opposite the right-hand edge of the cloth. The piece of fabric is then folded over until the eighteen inches of selvage edge is in contact with the inner face of the cross-arm 11, the folding-line being continuous with the hinge-line of the two arms and the outer end of the selvage being directly opposite the eighteen-inch mark of the inner scale on the cross-arm. After the fabric is creased on the folded line it is placed in folded condition between the two arms, and the latter are closed to form a holding-clamp, as shown in Fig. 2, the fabric being then readily cut by a knife or pair of scissors. To facilitate the holding of the fabric while in the clamp, the inner faces of the arms are provided with projecting pins or teeth for engagement with the fabric, the pins of the opposite arms being alternately arranged and each arm being provided, if desired, with small openings for the reception of the pointed ends of the pins after the latter are pressed through the fabric. To prevent slipping of the cross-arm, the lower face of the latter is preferably covered with a strip of felt 15 or other suitable material adapted to frictionally engage the surface of the fabric. The adjacent hinged ends of the two arms are arranged to form a miter-joint, and each arm is extended to a point some distance to the rear and parallel with the meeting edges of the joint-section. To each arm of the rearwardly-extended portions thereof are secured hinge-leaves 17, connected by a hinge-pin 18 of considerable length, this elongated hinge serving to brace and strengthen the connection and to maintain the parts in proper relative positions, with the arms at a right angle to each other, while at the same time the extended portions form a convenient handle for manipulating the device.

On the outer face of the base member is placed a yard-scale 19, divided into inches and fractions thereof in order that the device may be used as a yardstick for the measurement of goods in the ordinary manner.

While the construction herein described and illustrated in the accompanying drawings is the preferred form of the device, it is obvious that various changes in the form, proportions, size, and minor details of the structure may be made without departing from the spirit or sacrificing any of the advantages of the invention.

Having thus described the invention, what I claim is—

1. A scale for measuring bias cuts of cloth, comprising a pair of arms, a hinged miter-joint connecting the arms at right angles, said arms bearing measuring-scales having inch and fractional divisions and commencing at the point of bifurcation of the arms, and the lower or selvage measuring arm being further provided with a width-indicating table having its designating-marks arranged on the division-line of the measuring-scale, the cross-arm having a second table denoting the hypotenuse length of strips of cloth of varying width, the designating-marks of said second table being arranged on the division-lines of the adjacent measuring-scale.

2. A scale for measuring bias cuts of cloth, comprising a pair of arms connected by a miter-joint and each bearing measuring-scales, both arms having outwardly-extended angular portions to form a handle, and a hinge connecting the two arms and extending in a plane outwardly beyond the point of bifurcation of said arms and forming a part of the handle, the handle portion of the device projecting at an angle to the lines of the arms when the latter are in both open and closed positions and projecting beyond the plane of the outer edges of said arms, substantially as specified.

3. In a device of the class specified, a pair of arms arranged at a right angle to each other and provided at their adjacent ends with a miter-joint having outwardly-extending portions, hinged leaves secured to said arms and to the extended portions thereof, a pintle connecting the leaves, measuring-scales arranged on the upper surfaces of said arms at points near the inner edges thereof, auxiliary tables arranged adjacent to the measuring-scale for determining the dimensions of an angular piece of material of which the length of one side is known, a covering of felt or the like arranged on the outer surface of one of said arms for frictional contact with the material to be measured, clamping-pins carried by the inner faces of the arms for holding the material in position between them, and an auxiliary scale arranged on the outer surface of one of said arms.

In testimony that I claim the foregoing as my own I have hereto affixed my signature in the presence of two witnesses.

WALKER H. BLANDIN.

Witnesses:
 W. L. PORTER,
 MYRZA DANIEL.